(12) United States Patent
Motamed et al.

(10) Patent No.: US 8,718,210 B2
(45) Date of Patent: May 6, 2014

(54) CHANNEL IMPULSE RESPONSE ESTIMATION FOR WIRELESS RECEIVER

(75) Inventors: Mariam Motamed, San Diego, CA (US); Alexei Yurievitch Gorokhov, San Diego, CA (US); Mike L. Mccloud, San Diego, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 13/237,868

(22) Filed: Sep. 20, 2011

(65) Prior Publication Data

US 2013/0070869 A1   Mar. 21, 2013

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl.
USPC ........... 375/346; 375/260; 375/343; 375/231; 375/232; 375/285; 370/208; 370/203; 370/210; 370/206

(58) Field of Classification Search
USPC ......... 375/346, 349, 260, 343, 231, 232, 233, 375/285, 340; 370/208, 203, 210, 206
See application file for complete search history.

(56) References Cited

U.S. PATENT DOCUMENTS

| | | | |
|---|---|---|---|
| 7,440,506 B2 | 10/2008 | Atungsiri et al. | |
| 7,577,087 B2 * | 8/2009 | Palin | 370/210 |
| 7,929,597 B2 | 4/2011 | Mergen et al. | |
| 8,077,781 B2 * | 12/2011 | Ido | 375/260 |
| 8,098,567 B2 * | 1/2012 | Brehler et al. | 370/203 |
| 8,472,538 B2 * | 6/2013 | Wilhelmsson et al. | 375/260 |
| 2005/0174929 A1 * | 8/2005 | Hayashi et al. | 370/208 |
| 2005/0213679 A1 * | 9/2005 | Yamagata | 375/260 |
| 2005/0213680 A1 * | 9/2005 | Atungsiri et al. | 375/260 |

(Continued)

FOREIGN PATENT DOCUMENTS

WO   2008109600 A1   9/2008
WO   2011066271      6/2011

OTHER PUBLICATIONS

International Search Report and Written Opinion—PCT/US2012/056125—ISA/EPO—Jan. 11, 2013.

*Primary Examiner* — Phuong Phu
(74) *Attorney, Agent, or Firm* — Novak Druce Connolly Bove + Quigg LLP

(57) ABSTRACT

Estimating a channel impulse response (CIR) for a wireless transmission, for example a multimedia broadcast multicast services single frequency network (MBSFN) transmission, may be performed by a receiver of an wireless subframe, without requiring operational memory in excess of what is needed for CIR estimation of unicast signaling, while providing enhanced delay spread coverage. The wireless subframe may be a MBSFN subframe. The receiver may form an aggregate vector of pilot tones extracted from an OFDM reference symbol of an wireless subframe. The receiver may subsample the aggregate vector to obtain a plurality of sub-vectors each comprising a distinct subsampling phase. The receiver may process the plurality of sub-vectors using an inverse fast Fourier transform to obtain time domain representations of each of the sub-vectors. The receiver may combine the time domain representations in various ways to obtain a CIR estimate for the wireless subframe.

34 Claims, 12 Drawing Sheets

(56) References Cited

U.S. PATENT DOCUMENTS

| | | | |
|---|---|---|---|
| 2006/0239178 A1* | 10/2006 | Svensson et al. | 370/208 |
| 2008/0084817 A1* | 4/2008 | Beckman et al. | 370/210 |
| 2009/0185630 A1 | 7/2009 | Yang et al. | |
| 2010/0014600 A1* | 1/2010 | Li et al. | 375/260 |
| 2011/0026577 A1* | 2/2011 | Primo et al. | 375/232 |
| 2011/0026620 A1 | 2/2011 | Liao et al. | |
| 2011/0142118 A1* | 6/2011 | Seo et al. | 375/229 |
| 2011/0149943 A1* | 6/2011 | Srinivasan et al. | 370/343 |
| 2012/0033754 A1* | 2/2012 | Koorapaty et al. | 375/260 |
| 2012/0188994 A1* | 7/2012 | Palanki et al. | 370/344 |

* cited by examiner

CHANNEL IMPULSE RESPONSE ESTIMATION FOR WIRELESS RECEIVER

FIELD

Aspects of the present disclosure relate generally to wireless communication systems, and more particularly, to improvements in Channel Impulse Response (CIR) estimation such as may be used with certain types of multicast/broadcast subframes.

BACKGROUND

Wireless communication networks are widely deployed to provide various communication services such as voice, video, packet data, messaging, broadcast, or other services. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, sometimes referred to as user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling. In broadcast operation, several eNBs in a broadcast area broadcast signals in a synchronized fashion, carrying information that can be received and accessed by any subscriber UE, or in the case of multicast broadcast by a specific group of UEs, in the broadcast area. The generality of broadcast operation enables greater efficiency in transmitting information of general public interest, for example, event-related multimedia broadcasts.

As the demand and system capability for event-related multimedia and other broadcast services has increased, system operators have shown increasing interest in making use of broadcast operation in 3GPP and 3GPP2 networks. In the past, 3GPP LTE technology has been primarily used for unicast service, leaving opportunities for improvements and enhancements related to broadcast services. Analogous multicast/broadcast operations may also be implemented in wireless communications outside of the 3GPP or 3GPP2 context.

SUMMARY

Reference signal (RS) symbols may be inserted in wireless subframes for channel parameter estimation. Channel parameters may be estimated by converting RS tones into the time domain via an Inverse Fast Fourier Transform (IFFT). A reduced complexity methodology for estimating the channel impulse response (CIR) may subsample the original RS pattern prior to IFFT and subsequently combine results in the time domain in order to achieve compact channel parameterization, reduce system memory use, increase processing speed, or obtain results consistent with an adopted specification. The reduced complexity methodology may use FFT radix of 2 or FFT radix greater than 2 in order to achieve compact CIR representation.

Release 9 of 3GPP2 provides support for evolved Multimedia Broadcast and Multicast Services (eMBMS) using Single Frequency Network (MBSFN) transmission. MBSFN reference signal symbols may be inserted in wireless subframes for channel parameter estimation at the UE. MBSFN reference signal symbols may differ from their unicast counterpart, Cell-Specific Reference Signals (CS-RS) in several ways, including having a different time/frequency periodicity. Cell-specific RS symbols may have a frequency periodicity of 6 tones while MBSFN RS symbols may have frequency periodicity of 2 tones.

The time domain signal at the output of the IFFT may provide a noisy estimate of the Channel Impulse Response (CIR). The noisy CIR estimate may be processed further to provide an estimate of channel parameters. An MBSFN CIR may be estimated from MBSFN RSs, while unicast CIR may be estimated from CS-RSs. Existing CIR estimation methods for MBSFN signals may require more IFFT points and intermediate memory than unicast CIR estimation. Existing MBSFN CIR estimation methods may therefore sometimes impose requirements that exceed the capacity of UE hardware or firmware, or that cause an undesirable amount of computational overhead.

A reduced complexity methodology may be used to obtain a time domain estimate of the channel impulse response from reference signals in a wireless transmission, for example, MBSFN reference signals. An FFT size and FFT radix may be selected so as to yield the most compact CIR representation, or a more compact CIR representation, and thereby reduce the amount of memory and number of computational steps needed to perform the reduced complexity CIR estimation method. To obtain the most compact CIR estimate, IFFT sizes and radix may be selected in such a way that the delay spread accommodated by the CIR estimate does not exceed a desired delay spread. The desired delay spread may be derived from the length of the cyclic prefix, performance guidelines or field measurements. The most compact CIR representation may enable use of the same number of IFFT points and intermediate memory as needed for CS-RS CIR estimation, or fewer. Thus, estimation of channel parameters for an MBSFN signal may share the same hardware and/or firmware as used for unicast CIR computation.

In an aspect, a mobile entity may receive MBSFN reference signals for an eMBMS channel, or similar reference signals, and compute a CIR using operations summarized as follows. The mobile entity may form an RS tone vector and split the RS tone vector into p sequences each representing a subsampling phase. The mobile entity may select a value of p to provide a more compact CIR representation, or a most compact CIR representation. Then, the mobile entity may operate on each of the p sequences using an IFFT, and combine the resulting outputs to obtain a CIR for the eMBMS or other wireless transmission channel. Optionally, the mobile entity may truncate the CIR to match delay spread coverage requirements.

Similarly, a method for estimating a CIR for a wireless transmission channel, using a receiver, may include forming an aggregate vector of pilot tones extracted from an Orthogonal Frequency Division Multiplex (OFDM) reference symbol of an wireless subframe. The receiver may be, for example, a subscriber UE or a mobile entity of a wireless communication system. The receiver may be used to perform all operations of the method. The method may include subsampling the aggregate vector to obtain a plurality of sub-vectors each comprising a distinct subsampling phase. The method may include processing the plurality of sub-vectors using an inverse fast Fourier transform to obtain time domain representations of each of the sub-vectors. The method may include combining the time domain representations to obtain a CIR estimate for the wireless sub frame.

In an aspect of the method, the receiver may subsample the aggregate vector to obtain each of the sub-vectors having an identical number of elements. For example, when an aggregate vector has 'N' pilot tones, subsampling the aggregate vector may include, for each of a number 'p' of subsampling phases from 0 to p−1, selecting every 'pth' pilot tone from the aggregate vector to obtain respective ones of 'p' number of sub-vectors each containing a different N/p portion of the N pilot tones. In such case, the receiver may select a value of 'p' to obtain the CIR having a more compact representation, for example, a most compact representation. For example, the receiver may select a value of three for 'p'. In another aspect, the method may include combining the time domain representations by extending and destaggering the time domain representations to obtain the CIR estimate.

In another aspect, forming the aggregate vector may include using only pilot tones extracted from a single OFDM reference symbol to form the aggregate vector. In an alternative, forming the aggregate vector may include combining pilot tones extracted from adjacent OFDM reference symbols to form the aggregate vector, to increase a resolvable delay spread of the CIR estimate. In such case, combining the time domain representations may further include extending and destaggering the time domain representations to form a first time domain representation. The receiver may then destagger the first time domain representation across OFDM reference symbol pairs to provide the CIR estimate.

In related aspects, a communications apparatus may be provided for performing any of the methods and related aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities of various types used for wireless communications. Similarly, an article of manufacture may be provided, including a non-transient computer-readable storage medium holding encoded instructions, which when executed by a processor, cause a communications apparatus to perform the methods and aspects of the methods as summarized above.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA) or CDMA 2000. UTRA includes Wideband CDMA (WCDMA) and other variants of CDMA. CDMA 2000 may be described by IS-2000, IS-95 and IS-856 standards. A TDMA network may implement a radio technology such as, for example, Global System for Mobile Communications (GSM). An OFDMA network may implement a radio technology such as, for example, Evolved UTRA (E-UTRA), Ultra Mobile Broadband (UMB), IEEE 802.11 (Wi-Fi), IEEE 802.16 (WiMAX), IEEE 802.20, and Flash-OFDMA. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. By way of example only, certain aspects of the techniques are described below for LTE, and LTE terminology is used in much of the description below.

Figure 1:
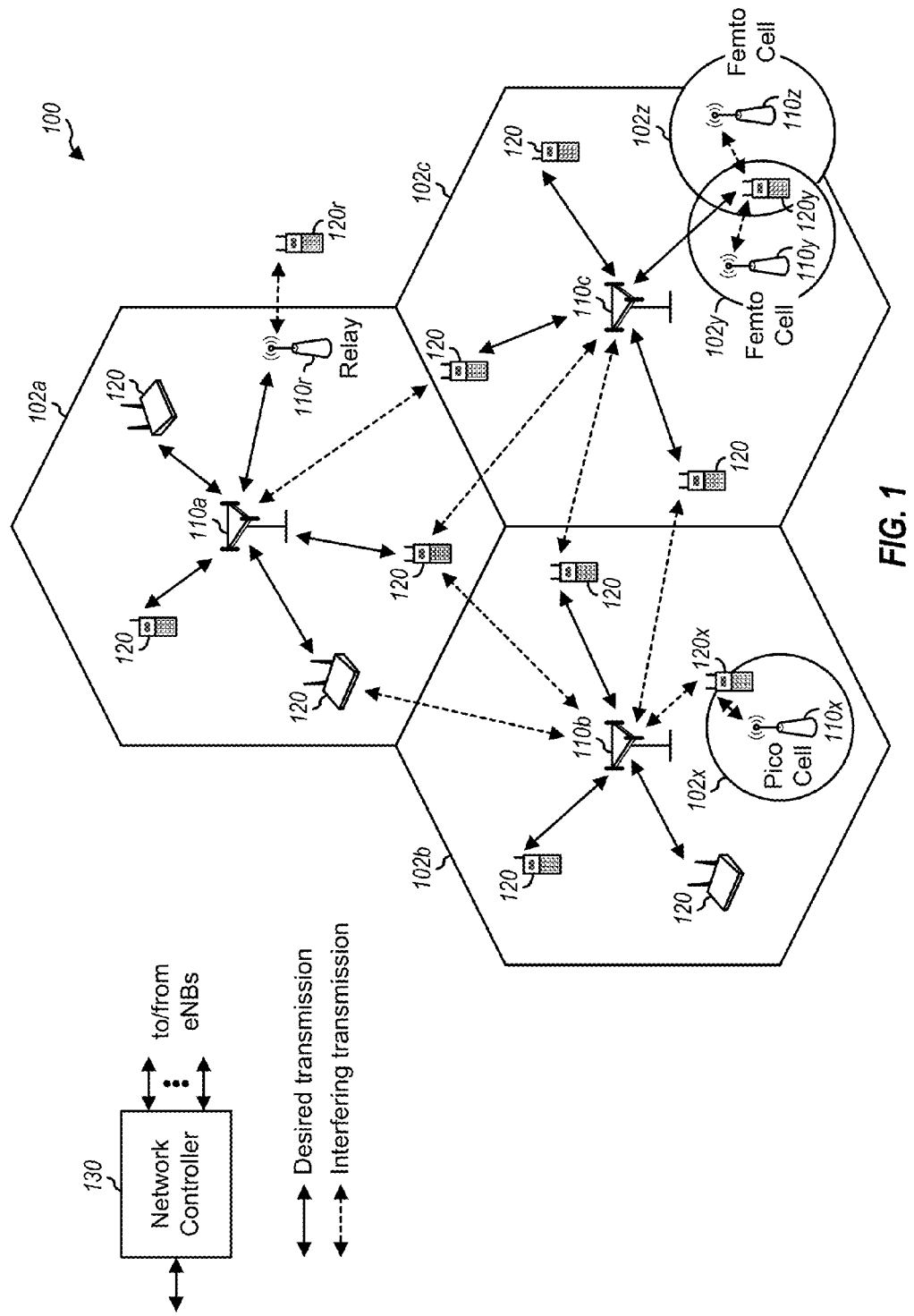
FIG. 1 is a schematic diagram conceptually illustrating an example of a wireless telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one cell using a single carrier, or multiple cells using corresponding multiple carriers.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 5 to 40 Watts) whereas pico eNBs, femto eNBs and relays may have a lower transmit power level (e.g., 0.1 to 2 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a mobile entity, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
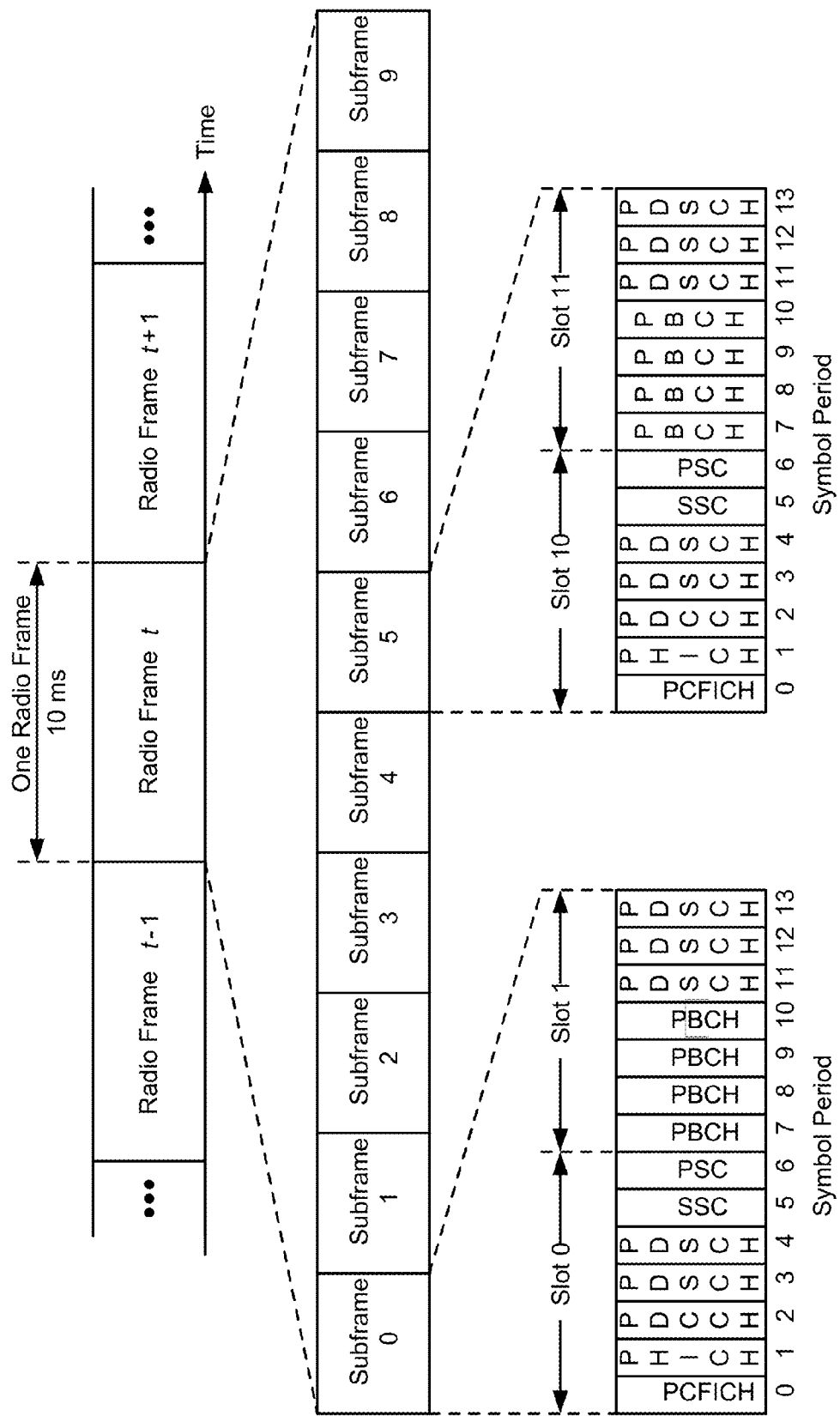
FIG. 2 is a block diagram conceptually illustrating an example of a down link frame structure in a LTE telecommunications system.
Figure 6:
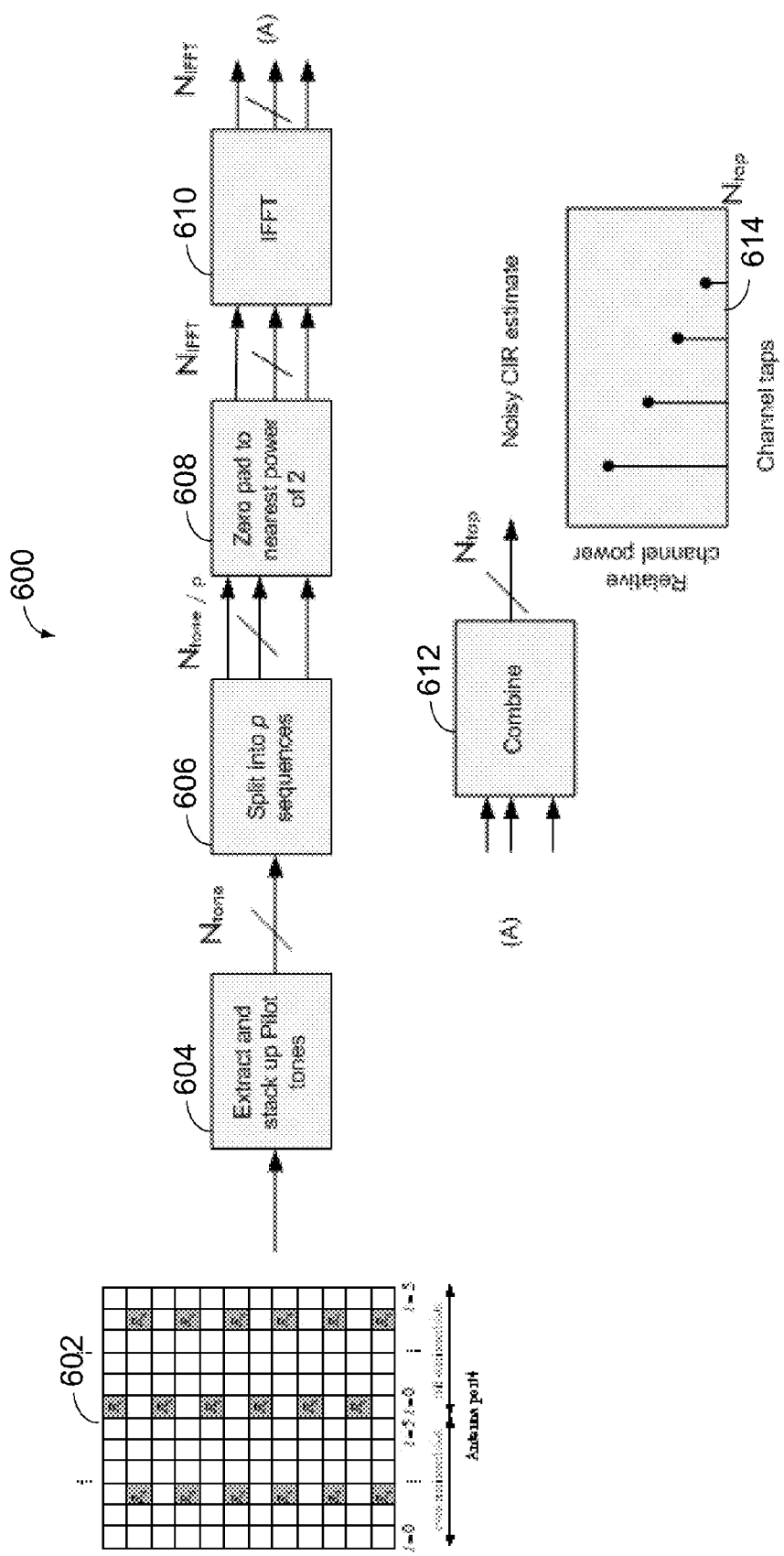
FIG. 6 is a flow diagram illustrating an example of estimating a CIR from MBSFN RS pilot tones.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as, for example, received power, path loss, signal-to-noise ratio (SNR), or other criterion.

Figure 3:
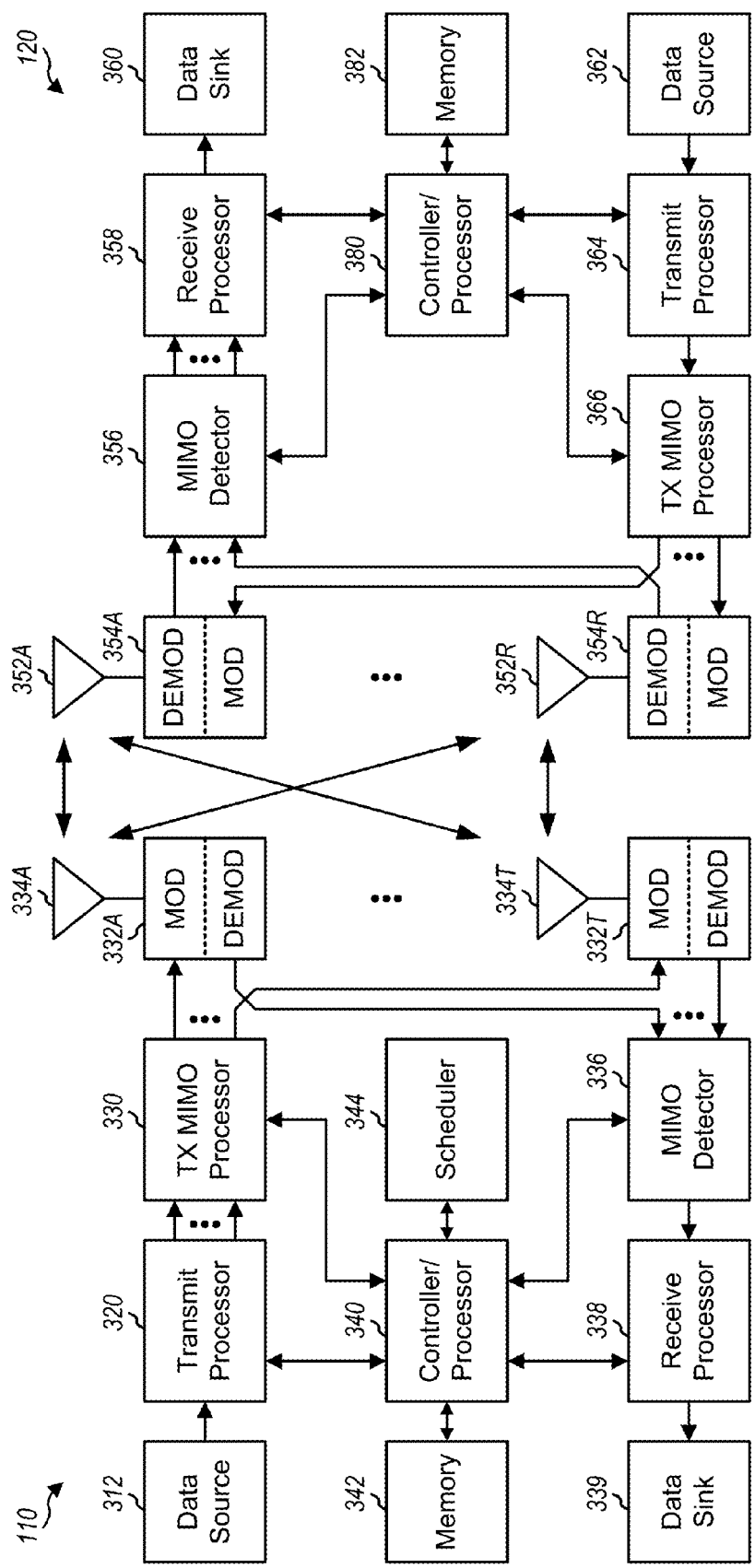
FIG. 3 is a block diagram conceptually a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110*c* in FIG. 1, and the UE 120 may be the UE 120*y*. The base station 110 may also be a base station of some other type. The base station 110 may be equipped with antennas 334*a* through 334*t*, and the UE 120 may be equipped with antennas 352*a* through 352*r*.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332A through 332T. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332A through 332T may be transmitted via the antennas 334A through 334T, respectively.

At the UE 120, the antennas 352A through 352R may receive the downlink signals from the base station 110 and may provide received signals to the demodulators (DEMODs) 354A through 354R, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354A through 354R, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354*a* through 354*r* (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In an aspect, the base station 110 for wireless communication includes means for receiving an instruction from a network entity of the WCS to maintain a designated set of subframes devoid of designated downlink signals in transmissions from the base station, coupled to means for providing an indication in a wireless transmission to a mobile entity enabling prior identification of subframes in the designated set. The indication may be provided by explicit or implicit signaling. The indication may be configured so as to be useful to a UE, for example, for controlling a number of blind decoding operations used to decode designated downlink control signals. In one aspect, the aforementioned means may include the processor(s), the controller/processor 340, the memory 342, the transmit processor 320, the TX MIMO processor 330, the modulators 332A, and the antennas 334A configured to perform the functions recited by the aforementioned means. In another aspect, the aforementioned means may be a module or any apparatus configured to perform the functions recited by the aforementioned means.

In another aspect, the UE 120 for wireless communication includes means for receiving an indication from a base station identifying a set of subframes that are devoid of designated downlink signals, coupled to means for identifying the set of subframes and using the identification to process control information in the set of subframes, for example, controlling a number of blind decoding operations using the identification information. In one aspect, the aforementioned means may include the processor(s), the controller/processor 380, the memory 382, the receive processor 358, the MIMO detector 356, the demodulators 354A, and the antennas 352A configured to perform the functions recited by the aforementioned means. In another aspect, the aforementioned means may be a module or any apparatus configured to perform the functions recited by the aforementioned means.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB (or eNBs) within radio range. Each UE may receive Multicast Control Channel (MCCH) information from a serving eNB for decoding the eMBMS signal.

As with unicast signals, the receiver may compute and use a CIR for the eMBMS channel to process received signals and decode transmitted information. However, because of differences in unicast and eMBMS signals, computation of the CIR may differ. The present application discloses various examples of CIR calculations for channel estimation with respect to eMBMS by way of example only, and not by way of limitation. For example, the present technology may also be applied in the context of MBMS.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile devices, such as, for example, UEs.

With respect to a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such, current eMBMS design allows at most six out of ten subframes for eMBMS.

Figure 4:
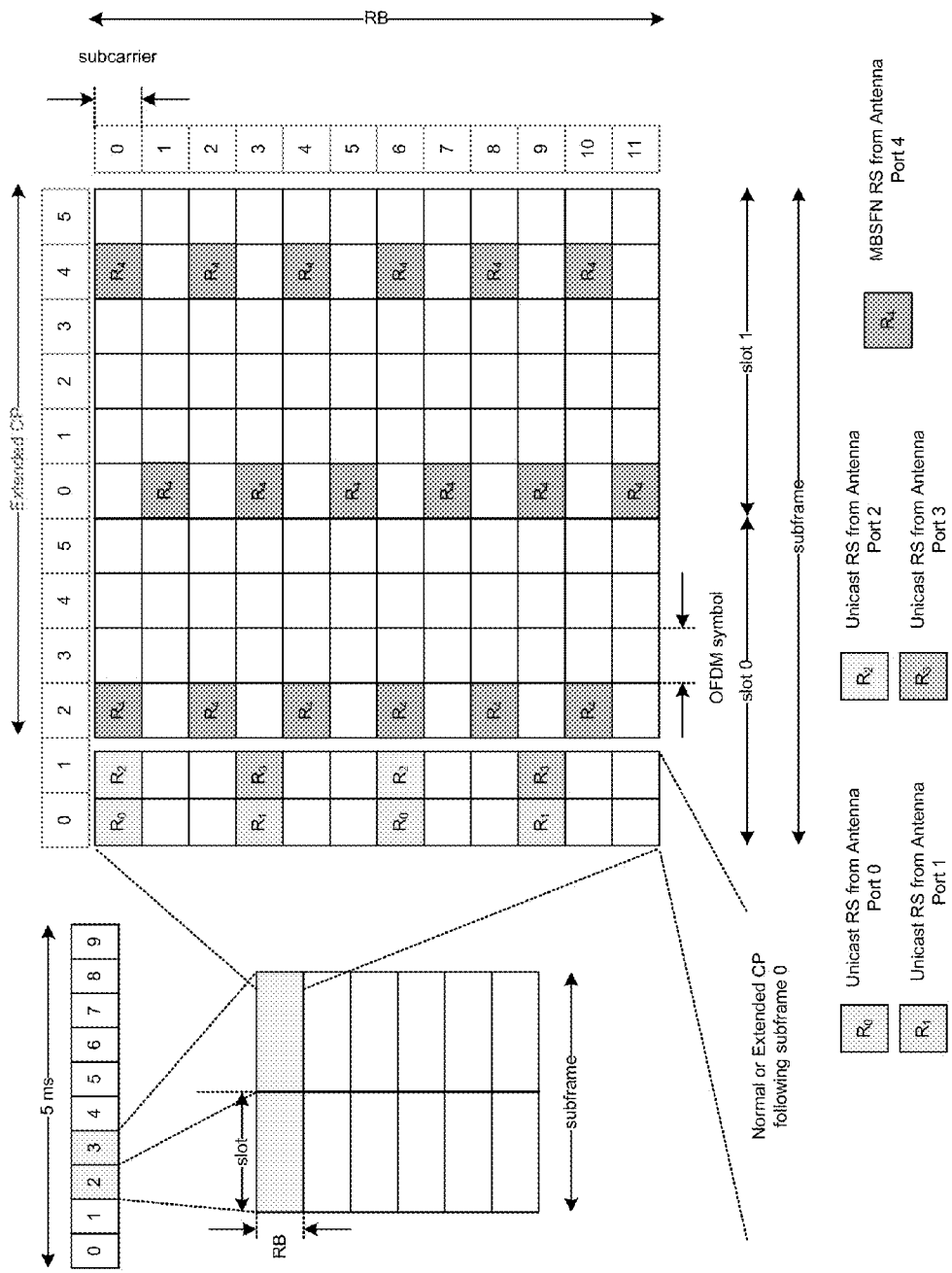
FIG. 4 is a diagram of a signaling frame illustrating an example of symbol allocation for unicast and multicast signals in a wireless subframe.

An example of subframe allocation for eMBMS is shown in FIG. 4, which shows an existing allocation of MBSFN reference signals on wireless subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz, and the sum of the subcarriers spanning 180 kHz. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

aMBMS Reference Signal Structure

With continued reference to FIG. 4, within each eMBMS subframe, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes as shown in FIG. 4, and separately allocating unicast RSs on non-MBSFN subframes. More specifically, as FIG. 4 shows, the extended CP of the MBSFN subframe includes MBSFN RSs but not unicast RSs. An MBSFN subframe may be defined using an extended CP only. MBSNF subframes carrying the physical multicast channel (PMCH) may contain 3 RS symbols. The MBSFN RS symbols may have a tone frequency periodicity of 2. RS symbols may be in one of two slots designated "slot 0" and "slot 1" as indicated beneath the subframe. RS tones in symbol 2 of slot 0 and symbol 4 of slot 1 may start at one tone offset. RS tones in symbol 0 of slot 1 may start with 0 tone offset The present technology is not limited to the particular frame allocation scheme illustrated by FIGS. 2 and 4, which are presented by way of example, and not by way of limitation. A broadcast session as used herein may use any suitable frame allocation scheme.

Unicast CIR Computation

An estimate of the channel impulse response for a received signal over the delay spread of the channel in which the signal is received may be required for processing of the signal. A delay spread may be defined as the time interval between the first and last delayed path of a signal at the receiver. In other words, the channel impulse response needs to be estimated over the delay range where the average output power of the channel is essentially non-zero. By way of comparison, unicast CS-RS symbols may have a frequency domain sampling of 6 tones. With 15 KHz sub-carrier spacing, 6-tone spacing yields a delay spread resolution of approximately, $1/(15 \text{ KHz} \times 6) = 11.1$ µs. This may be smaller than the delay spread of typical wireless channels in LTE. For unicast CS-RS, adjacent pilot symbols may be combined or stacked to effectively reduce the frequency domain sampling from 6 tones to 3 tones, increasing resolvable delay spread to $\sim 1/(15 \text{ KHz} \times 3) = 22.2$ µs for 15 KHz sub-carrier spacing. CIR estimation using unicast CS-RS signals may be proceed by taking an IFFT of the RS tones of combined pairs of CS-RS signals to obtain a noisy CIR estimate. A drawback of this straight forward approach may include the use of each RS tone twice, resulting in extra IFFT computation per RS symbol. Alternatively, each RS vector may be converted to a time domain representation using an IFFT algorithm, and the stacking or destaggering of pairs may then be performed in the time domain via a Finite Impulse Response (FIR) filter. Destaggering may generally refer to a process of combining separate ("staggered") signal observation vectors into a combined vector. Specific examples of destaggering procedures are described herein below. Conversion to a time domain representation may use decimation in a frequency IFFT algorithm. In signal processing, decimation may refer to reducing the number of samples in a discrete-time signal, using a filter and downsampling.

Figure 5:
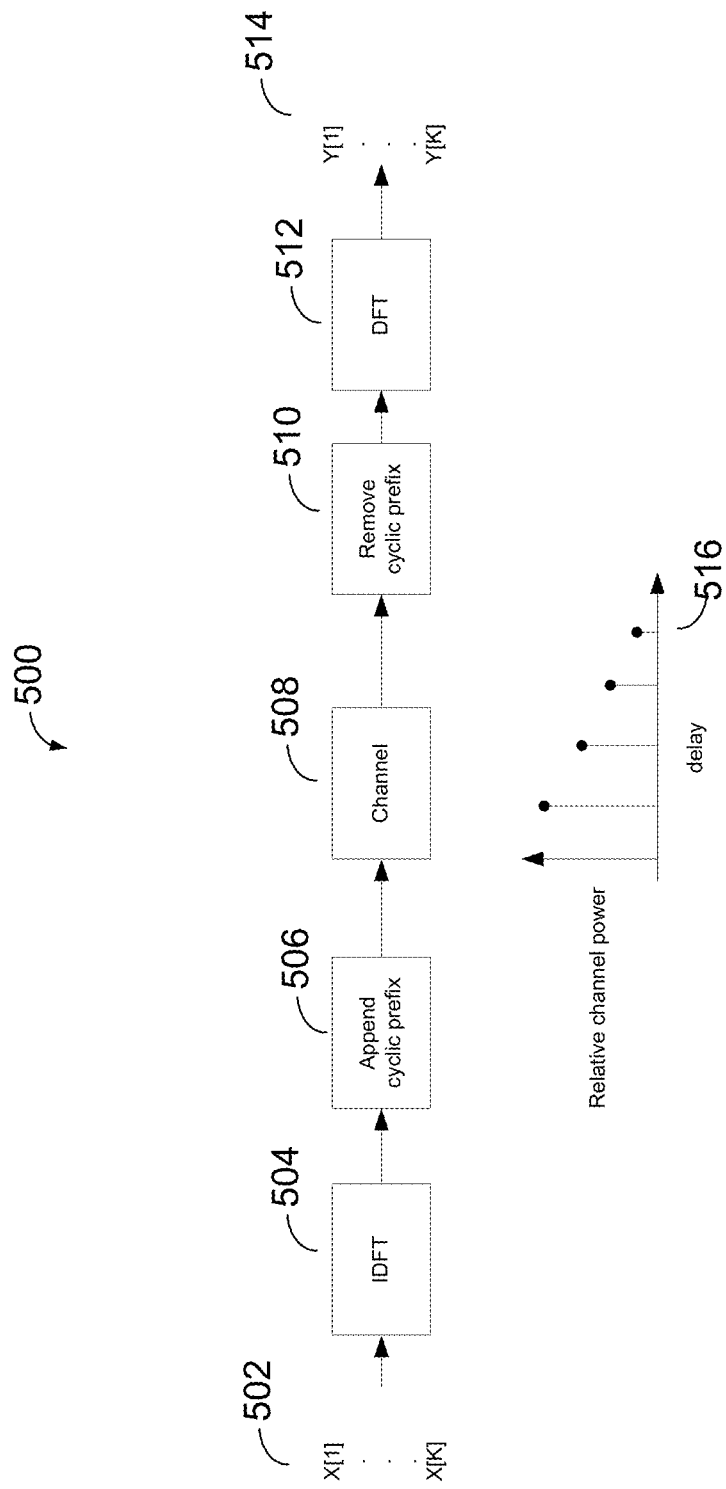
FIG. 5 is a flow diagram illustrating signal processing through a simplified OFDM communication system.

FIG. 5 shows a simplified OFDMA system 500 for CIR estimation. In the transmitter, OFDMA tones 502 may be converted 504 to a time domain representation using an inverse discrete Fourier transform (IDFT). A cyclic prefix may be appended 506 to the time domain representation. The signal at the output of the transmitter may be processed through the wireless channel. The graph 516 illustrates the impulse response of the wireless channel. In the receiver, the cyclic prefix may be removed 510 and a discrete Fourier transform (DFT) 512 then applied to the result to obtain an output channel estimation vector 514.

Pilot tones may be used for channel estimation. An output CIR estimate may provide a measure of relative channel amplitude and phase at discrete time intervals, or taps, over a delay spread, illustrated in graphical form at 516. The delay spread may represent an amount of time required for channel taps to subside below a noise floor and become undetectable.

Unicast CIR Estimation Via Destaggering of Pairs

The following provides an example of a unicast CIR estimation using destaggering of CS-RS pairs, such as may be performed by a mobile entity. For purposes of example, a channel bandwidth of 20 MHz is assumed, with each unicast RS symbol containing 200 tones. Initially, the 200 tone RS vector may be zero padded to nearest power of 2, to form a 256 point vector. Then, the mobile entity may perform an $N_{IFFt}$=256 point IFFT to form a time-domain sequence, h(n), wherein $N_{IFFt}$ represents a number of input points for the IFFT. The mobile entity may combine the noisy CIR output, h(n), with the noisy CIR estimate, h(n−1) from a previous adjacent RS tone vector, to effectively reduce the frequency domain sampling to 3 tones and increase the resolvable delay spread to ~22.2 us, effectively resulting in an $N_{tap}$=512 ptCIR estimate, g(n), wherein $N_{tap}$ represents a number of channel tap estimates ("taps") in the destaggered output vector g(n). Assuming cell-specific frequency shift, and a transmit antenna port 0, the mobile entity may obtain a 512-tap noisy CIR estimate, g(n) using the following formula:

$$g(n) = \frac{1}{2}\begin{pmatrix} S(n)h(n) \\ (-1)^n S(n)h(n) \end{pmatrix} + \frac{1}{2}\begin{pmatrix} S(n-1)h(n-1) \\ (-1)^{n-1} S(n-1)h(n-1) \end{pmatrix}$$

where $S(n) = \text{diag}(\phi(n))$; and $$\phi(n) = \begin{cases} 1 & n: \text{ even} \\ \exp\left(\frac{j2\pi n3}{N_{IFFT}}\right) & n: \text{ odd} \end{cases}$$

The phase ramp, Ø(n), may remove an additional 3 tone offset for odd n. The symbol diag(Ø(n)) represents an n×n square matrix having elements of a vector Ø(n) on its diagonal. At each RS symbol, only the $N_{IFFt}$ point vector, z(n)=S(n)h(n), may need to be saved, because a 2-fold extension to $N_{tap}$ may be formed by repeating the $N_{IFFt}$ point vector, optionally including multiplication by negative 1.

The same approach as outlined above may be extended to non-zero cell-specific frequency shifts, and to RS symbols from other transmit antenna ports, by appropriately adjusting for frequency offset in the phase ramp. Furthermore, the same approach can be applied to system bandwidth less than 20 MHz, by appropriately selecting $N_{tap}$ and $N_{IFFt}$.

eMBMS CIR Estimation

In the discussion below, two options are presented for MBSFN CIR estimation. According to a first option, each noisy CIR estimate may be obtained from a corresponding single MBSFN RS symbol. This may provide CIR estimate having a resolvable delay spread of 1/(15 khz×2)≈33.3 µs for 15 KHz subcarrier spacing. This option may be used by mobile entities to accommodate a 28.5 µs extended delay spread, as specified by 3GPP2 Release 9 for Radio Access Network (RAN) 4.

According to a second option, each noisy CIR estimate may be obtained from destaggered pairs of neighboring MBSFN RS symbols. This may be used to effectively reduce frequency domain sampling and increase resolvable delay spreads up to ⅕ KHz≈66.6 µs, thereby providing a margin in resolvable delay spread over Release 9 RAN4 requirements.

These options are described in more detail below. Although in the following examples MBSFN CIR estimation is derived assuming a 20 MHz system bandwidth, the disclosed approaches may readily be extended to other channel bandwidths by appropriate selection of FFT numerology, for example as follows. In the first option, a radix 3 FFT algorithm may be used, or a radix greater than two. In the second option both radix 2 and radix 3 FFT algorithms may be used. As an example, for Option 2 discussed below using a 20 MHz system bandwidth, the FFT numerology may consist of radix 2 and radix 3 FFT algorithms utilizing 256 point IFFTs. Similarly, for Option 2 discussed below and 5 MHz system bandwidth, the FFT numerology may consist of radix 2 and radix 3 FFT algorithms utilizing 64 point IFFTs.

MBSFN CIR Based on One RS Symbol (Option 1)

A mobile entity may perform a MBSFN CIR estimation based on a single MBSFN RS symbol (which process may also be referred to herein as "Option 1"). For the example of a 20 MHz system bandwidth, each MBSFN RS symbol may have 600 tones. In a simplified approach, the mobile entity may perform CIR estimation by zero padding the 600 tones to nearest power of two, 1024, and taking a 1024 point IFFT. This FFT size may be larger than conventionally used in a unicast CS-RS based CIR estimation, e.g., 256 for CS-RS as compared to 1024 for MBSFN. Accordingly, the mobile entity should have enough memory for temporary storage of 1024 output taps. However, the relatively large memory space and additional computation of the simplified approach may not be desirable for many mobile entities.

To mitigate drawbacks of the simplified approach, a method 600 may be used, as summarized in FIG. 6. The method 600 may use a radix-3 FFT algorithm and may include decimating an input vector in frequency by a factor of 3, followed by combining the three signal observation vectors resulting from the decimation into a combined vector; i.e., "3-fold destaggering." The method may use a 256 point IFFT as explained above for CS-RS. The method may therefore require storage at the mobile entity of three 256 point time domain samples, 768 samples total, for CIR estimation. The resulting CIR estimation may provide delay spread coverage of about 33 µs.

For each MBSFN RS symbol h 602, the mobile entity may form a vector of tones, 'c,' by extracting and combining 604 the pilot tones. Then, at 606, the mobile entity may split the tone vector c into p sequences. For example, using p=3, the mobile entity may subsample c by three using respective starting phases of 0, 1, and 2, resulting in three vectors of tones, c0, c1, and c2, each corresponding to a subsampling phase, wherein c0=c(3k), c1=c(3k+1), c2=c(3k+2) and k= 0, . . . , $N_{tones}$, and $N_{tones}$ is the number of pilot tones in a symbol c. Assuming a 20 MHz system bandwidth, the vector c has 600 tones, and each subsampled vector has 200 tones.

At 608, the mobile entity may zero pad $c_i$, i={0,1,2}, to the nearest power of two, which for an initial vector of 200 tones for a 20 MHz bandwidth happens to be $N_{IFFT}$=256, where $N_{IFFT}$ denotes FFT size The mobile entity may then, at 610 perform an $N_{IFFT}$ point IFFT of each zero-padded vector to yield time-domain vectors, $h_i$, wherein i={0,1,2}. At 612, the mobile entity may combine the time-domain vectors $h_i$ to obtain a noisy CIR estimate, depicted graphically at 614. For example, the mobile entity may extend and destagger the time domain sequences, $h_i$, to result in $N_{tap}$ noisy CIR estimate 614, g, where $N_{tap}$=3×$N_{IFFT}$ and $N_{tap}$ denotes the number of taps of the estimated CIR. For a 20 MHz system bandwidth, $N_{tap}$ may be equal to 768. The mobile entity may obtain the $N_{tap}$ CIR estimate, g, by 3-fold extension and destaggering of $h_i$, i={0,1,2}, as given below:

$$g(n) = \frac{1}{3}\begin{pmatrix} \bar{h}_0 \\ \bar{h}_0 \\ \bar{h}_0 \end{pmatrix} + \frac{1}{3}\begin{pmatrix} S_1\bar{h}_1 \\ \alpha_1 S_1\bar{h}_1 \\ \alpha_1^2 S_1\bar{h}_1 \end{pmatrix} + \frac{1}{3}\begin{pmatrix} S_2\bar{h}_2 \\ \alpha_2 S_2\bar{h}_2 \\ \alpha_2^2 S_2\bar{h}_2 \end{pmatrix}$$

where $$\bar{h}_i = [h_i[0] \ldots h_i[N_{IFFT}]] i = 0, \ldots, 2.$$

This may be referred to as a 3-fold process because three separate vectors are extended and destaggered. The phase ramp functions ($S_j$) may be determined by:

$$S_1 = \text{diag}\left(\exp\left(\frac{j2\pi n}{Ntap}\right)\right) \text{ and}$$

$$S_2 = \text{diag}\left(\exp\left(\frac{j2\pi 2n}{Ntap}\right)\right) n = 0, \ldots, N_{IFFT}$$

wherein f=$\sqrt{-1}$ and diag(v) denotes a square matrix with elements of a vector 'v' having $N_{IFFT}$ components on its diagonal. One tone starting frequency offset for RS symbols 0 and 4 may be removed by applying a phase ramp:

$$\phi(n) = \left(\exp\left(\frac{j2\pi t\_offn}{Ntap*2}\right)\right) n = 0, \ldots N_{tap}$$

to g(n), with $t_{off}$=1. Parameters α1 and α2 are complex scalars given by:

$$\alpha_1 = \exp\left(\frac{j2\pi 3}{N_{tap}}\right)$$

$$\alpha_2 = \exp\left(\frac{j4\pi 3}{N_{tap}}\right)$$

For processing each RS symbol, the mobile entity may save only the $N_{IFFT}$ point vectors, $h_0$, $S_1h_1$, and $S_2h_2$, because 3-fold extension and 3-fold destaggering to $N_{tap}$ is done by repeated multiplication by complex scalar.

MBSFN CIR Based on RS Symbol Pairs (Option 2)

A simplified CIR estimation based on MBSFN RS pairs may include stacking up tones from neighboring RS symbol pairs (e.g., a total of 1200 tones for a 20 MHz system bandwidth), zero padding to nearest power of two (e.g., to $N_{IFFT}$=2048 for 20 MHz bandwidth), and taking an $N_{IFFT}$-point IFFT (e.g., 2048-point IFFT for 20 MHz bandwidth). The simplified approach, which lacks the subsampling operation 606 and the combination operation 612, may require a larger $N_{IFFT}$ than used in CS-RS based CIR estimation, for example 256 for unicast as compared to 2048 for MBSFN for 20 MHz bandwidth. The simplified approach also requires storage of 2048 CIR taps. Each RS symbol is used twice resulting in extra IFFT operations per RS symbol. The resolvable delay spread may be about 100 μs, much larger than 1 frequency tone resolution.

A more advantageous approach for use by a mobile entity (referred to herein as "Option 2") may include, for each RS symbol, performing a 3-fold decimation in frequency, followed by 3-fold destaggering of time domain sequences, as done in Option 1. Then, the mobile entity may utilize radix-2 FFT to combine time domain sequences across RS symbol pairs using two-fold destaggering, effectively resulting in a total number of estimated CIR taps of $N_{tap}$=6×$N_{IFFT}$. This approach may reduce storage requirements compared to the simplified approach using symbol pairs, and obtain a resolvable delay spread of about 66 μs, providing a margin over 3GPP2 Release 9 RAN4 requirements for resolvable delay spread.

Referring again to FIG. 6, the mobile entity may, for each RS symbol 602, form a vector of tones, h(n) at 604. At 606, the mobile entity may subsample h(n) by three using respective starting phases of 0, 1, and 2, and at 608 zero pad each subsampled sequence to the nearest power of 2 (e.g., to 256 point subsampled sequences for a 20 MHz system bandwidth). At 610, the mobile entity may perform an IFFT on the subsampled vectors to obtain time domain representations $h_i(n)$.

Option 2 may be similar to Option 1 in how the mobile entity extends and destaggers the time domain sequences, $h_i(n)$, to result in time domain sequence, x(n), at 612. The mobile entity may destagger the time domain sequences across RS symbol pairs to form $N_{tap}$ point noisy CIR estimate, g(n), wherein g(n) is determined by:

$$g(n) = \frac{1}{2}\begin{pmatrix} x(n) \\ x(n) \end{pmatrix} + \frac{1}{2}\begin{pmatrix} Sx(n-1) \\ -Sx(n-1) \end{pmatrix}$$

when n corresponds to RS symbols for tones starting with 0 tone offset; and by $$g(n) = \frac{1}{2}\begin{pmatrix} Sx(n) \\ -Sx(n) \end{pmatrix} + \frac{1}{2}\begin{pmatrix} x(n-1) \\ x(n-1) \end{pmatrix}$$

when n corresponds to RS symbols for tones starting with 1 tone offset. The phase ramp S may be determined by:

$$S = \text{diag}\left(\exp\left(\frac{j2\pi k}{N_{tap/2}}\right)\right) k = 0, \ldots, N_{tap}/2$$

At each RS symbol, the mobile entity may perform a 3×$N_{IFFT}$ point IFFT, and the resulting three separate $N_{IFFT}$ point sequences may therefore need to be stored. For a 20

MHz system bandwidth, $N_{IFFT}=256$ and $N_{tap}=1536$, the time domain sequence, x(n), may have 768 points, and the noisy CIR estimate g(n) may have 1536 taps. Only 768 samples have to be stored, because two-fold destaggering to 1536 taps may be obtained by repeating the 768 samples, possibly including multiplication by −1 of these samples. Taps may be truncated in the resulting CIR estimate 614, to decrease resolvable system delay spread. For example, for the 20 MHz system, the number of CIR taps may be truncated from 1536 to 1024, resulting in resolvable delay spread of about 44 μs. This delay spread provides about a 15 μs margin over 3GPP2 Release 9 RAN4 specifications for resolvable delay spread. It may be desirable to truncate output taps for various reasons, including but not limited to reducing system memory use, increasing processing speed, or obtaining results consistent with an adopted specification.

Figure 7:
FIG. 7 is a table illustrating results from different CIR estimation techniques for different channel bandwidths.

By way of example only, the table 700 illustrated in FIG. 7 shows illustrative values for $N_{tone}$, $N_{IFFT}$, and $N_{tap}$ for the Options 1 and 2 discussed above. As an example, for a 5 MHz system bandwidth, the number of RS tones, $N_{tone}$, in a MBSFN-RS symbol is 150. CIR estimation based on the methodology of Option 1 may be accomplished by implementing 64 point IFFTs and three-fold destaggering to obtain a noisy estimate of the channel impulse response with 192 taps resolving a delay spread of 33.3 us. For the 5 MHz system bandwidth, channel impulse response estimation following the methodology of Option 2 may be accomplished by implementing 64 point IFFTs and three-fold destaggering as well as two-fold destaggering across RS pair to yield a channel impulse response estimate with 384 taps resolving a delay spread of 66.6 us. Truncating the 384 CIR taps to 256 taps may reduce the resolvable delay spread to 44.4 us.

Example Methodologies and Apparatus

In view of exemplary systems shown and described herein, methodologies that may be implemented in accordance with the disclosed subject matter, will be better appreciated with reference to various flow charts. For purposes of simplicity of explanation, methodologies are shown and described as a series of acts/blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 8:
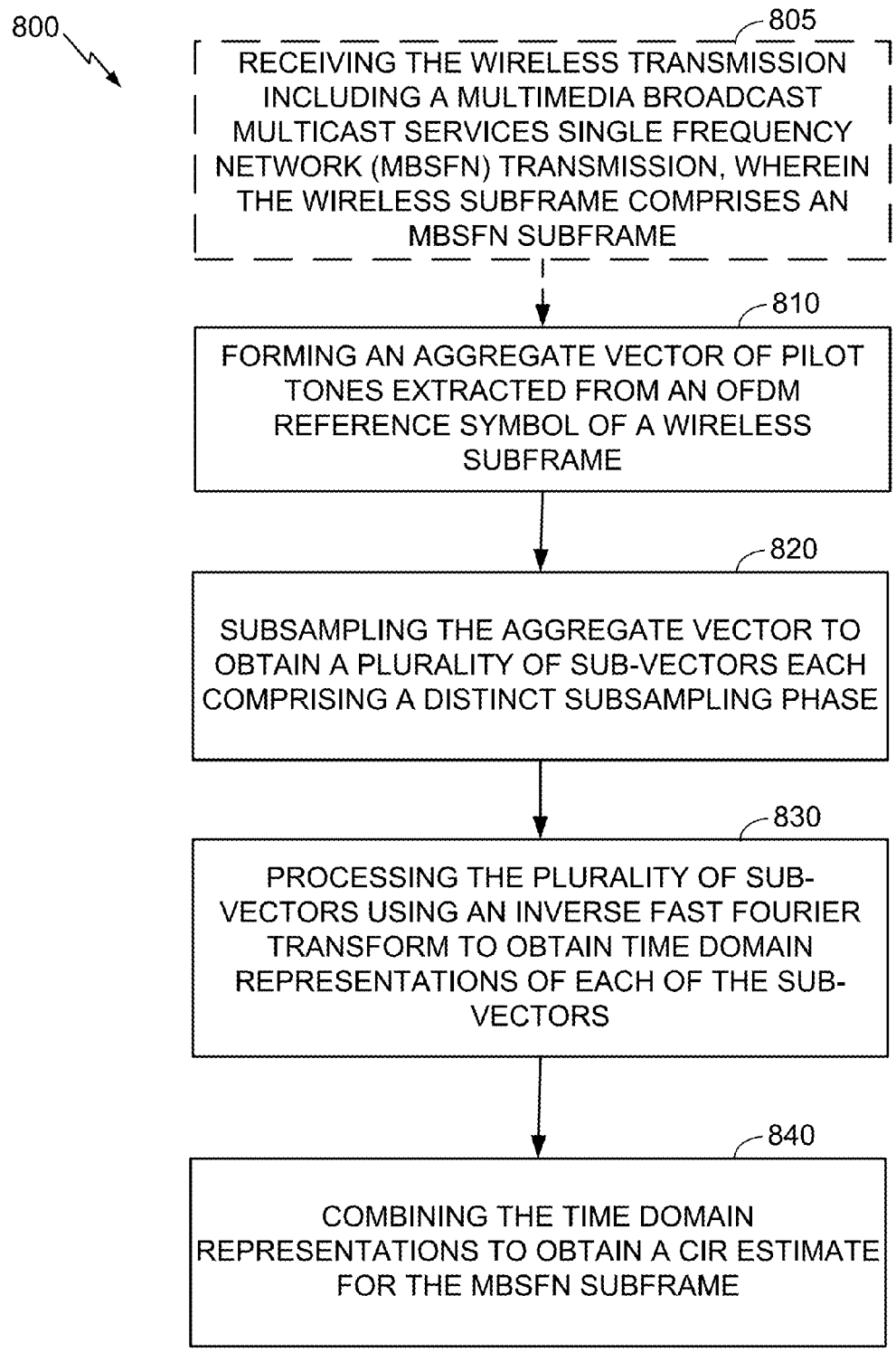
FIGS. 8-11 are flow diagrams illustrating embodiments of a methodology for estimating a CIR for an MBSFN channel.

A mobile entity may perform a method 800 for estimating a channel impulse response (CIR) for a wireless transmission, using a receiver, as shown in FIG. 8. The receiver may comprise a mobile entity of any of the various forms described herein, for example, a UE. Aspects of the method 800 may encompass both of the Options 1 and 2 discussed above. Other aspects may encompass Option 1 but not Option 2, or vice versa. The method 800 may include, at 810, forming an aggregate vector of pilot tones extracted from an Orthogonal Frequency Division Multiplex (OFDM) reference symbol of wireless transmission subframe, in a memory of the mobile entity. The vector of pilot tones may be configured as an ordered list or other data structure of tone values, ordered in relation to reference signals of the OFDM symbol. Optionally, the method 800 may include, at 805, receiving the wireless transmission including a multimedia broadcast multicast services single frequency network (MBSFN) transmission, wherein the wireless subframe comprises an MBSFN subframe. The receiver may also extract the aggregate vector of pilot tones from the OFDM reference symbol. The method 800 may further include, at 820, subsampling the aggregate vector to obtain a plurality of sub-vectors each comprising a distinct subsampling phase. The mobile entity may, or may not, separately store the sub-vectors. For example, the mobile entity may use a sampling algorithm, such as extracting every nth tone from the vector of pilot tones, to obtain the sub-vectors which it may store, or immediately process using an IFFT without storing. The method 800 may further include, at 830, processing the plurality of sub-vectors using an inverse fast Fourier transform to obtain time domain representations of each of the sub-vectors in a memory of the mobile entity. The method 800 may further include, at 840, combining the time domain representations to obtain a CIR estimate for the wireless subframe. The mobile estimate may use the CIR estimate for any suitable purpose related to downlink control and use of MBMS data. Various algorithms and other details pertinent to combining the time domain representations have been discussed above in connection with Options 1 and 2.

Figure 9:
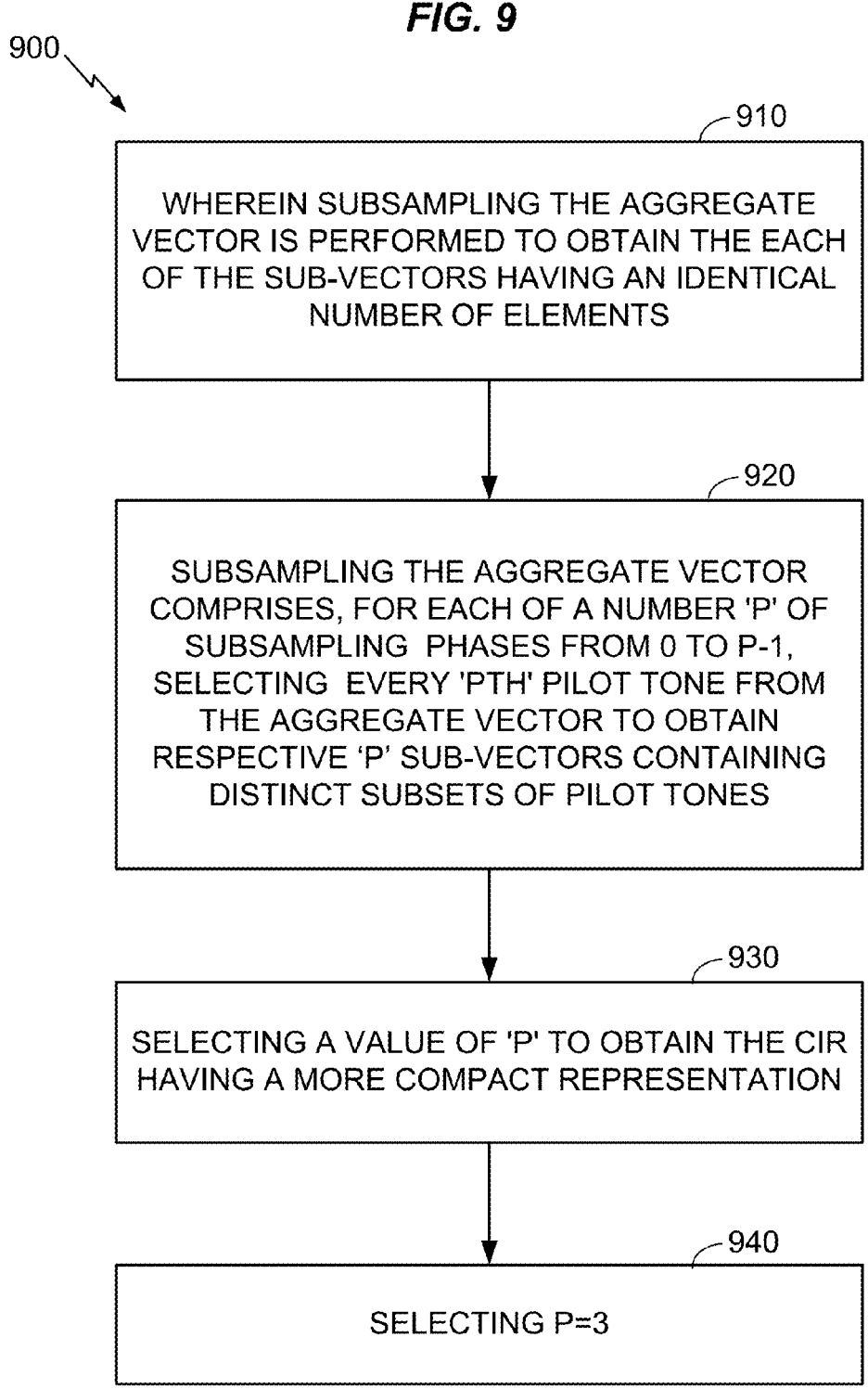
Figure 10:
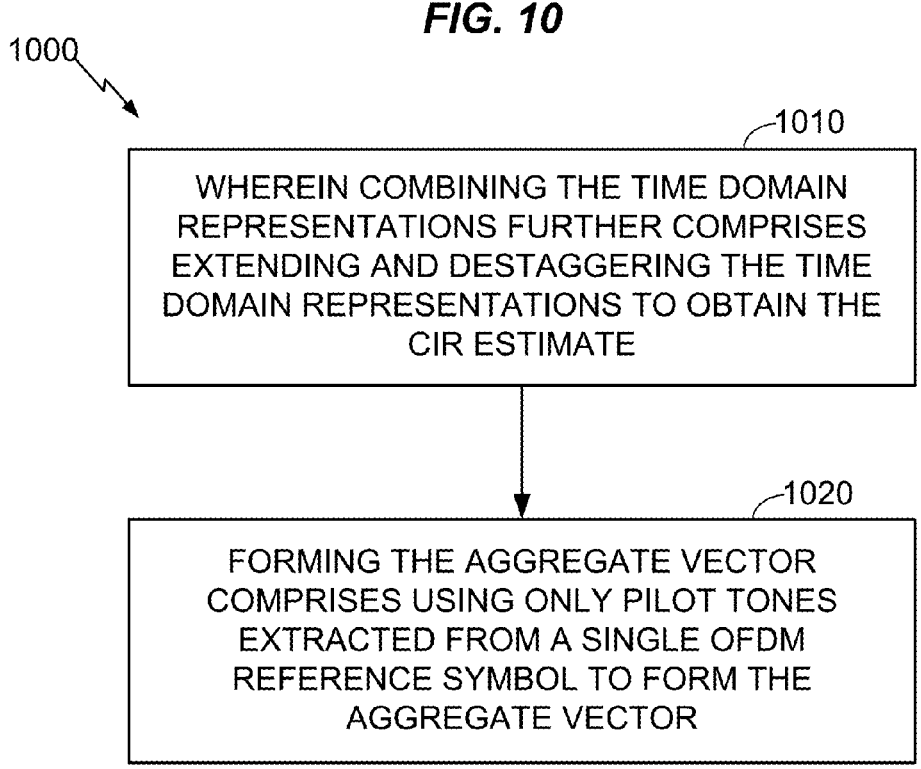
Figure 11:
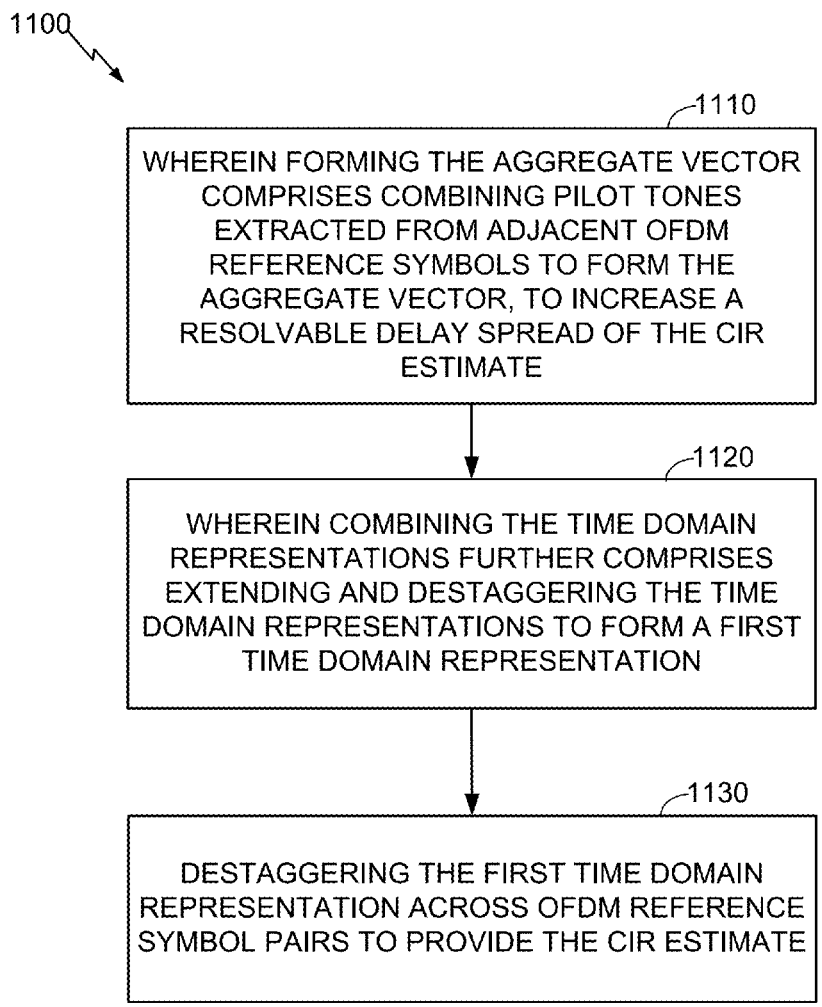

Certain of such details are also summarized below in connection with FIGS. 9-11, which show further optional operations or aspects 900, 1000, 1100 that may be performed by the mobile entity in conjunction with the method 800. The operations shown in FIGS. 9-11 are not required to perform the method 800. The operations are independently performed and not mutually exclusive. Therefore any one of such operations may be performed regardless of whether another downstream or upstream operation is performed. If the method 800 includes at least one operation of FIGS. 9-11, then the method 800 may terminate after the at least one operation, without necessarily having to include any subsequent downstream operation(s) that may be illustrated.

Referring to FIG. 9, method 800 may include one or more of the additional operations 900. In an aspect, the method 800 may further include, at 910, the mobile entity subsampling the aggregate vector is performed to obtain the each of the sub-vectors having an identical number of elements. That is, the mobile entity may perform the subsampling operation to obtain identically-sized sub-vectors. For example, as indicated at 920, for an aggregate vector consisting of 'N' number of pilot tones, the mobile entity may perform the subsampling of the aggregate vector by, for each of a number 'p' of sub-sampling phases from 0 to p−1, selecting every '$p^{th}$' pilot tone from the aggregate vector to obtain 'p' sub-vectors containing distinct subsets of the pilot tones. For example, respective ones the 'p' sub-vectors may each contain a different N/p portion of the N pilot tones, each representing a different subsampling phase. For further example, at indicated at 940, the mobile entity may select p equal to three, and in such case, the subsampled vectors may each consist of N/3 tones, assuming N is a multiple of three. In an aspect, the method 800 may include, at 930, selecting a value of p to obtain the CIR estimation having a more compact representation; for example, a most compact representation. To obtain a more compact CIR representation, or the most compact CIR representation, the number of tones processed using the IFFT algorithm and radix used for the IFFT processing may be selected such that the delay spread accommodated by the CIR estimate does not exceed a desired delay spread. The desired delay spread may be derived from the length of the cyclic prefix, performance guidelines or field measurements.

Referring to FIG. 10, method 800 may include one or more of the additional operations 1000. The method 800 may further include, at 1010, the mobile entity combining the time domain representations by extending and destaggering the time domain representations to obtain the CIR estimate. Details examples of extending and destaggering have been provided above in connection with Options 1 and 2. The method 800 may further include, at 1020, the mobile entity using only pilot tones extracted from a single OFDM reference symbol to form the aggregate vector.

In an alternative, the mobile entity may use pilot tones extracted from multiple OFDM reference symbols, as illustrated in FIG. 11 showing one or more of the additional operations 1100 that may be included in the method 800. The method 800 may further include, at 1110, the mobile entity forming the aggregate vector by combining pilot tones extracted from adjacent OFDM reference symbols to form the aggregate vector, to increase a resolvable delay spread of the CIR estimate. In such case, the method 800 may further include, at 1120, the mobile entity combining the time domain representations by extending and destaggering the time domain representations to form a first time domain representation. Then, at 1130, the mobile entity may destagger the first time domain representation across OFDM reference symbol pairs to provide the CIR estimate, in accordance with Option 2 above.

Figure 12:
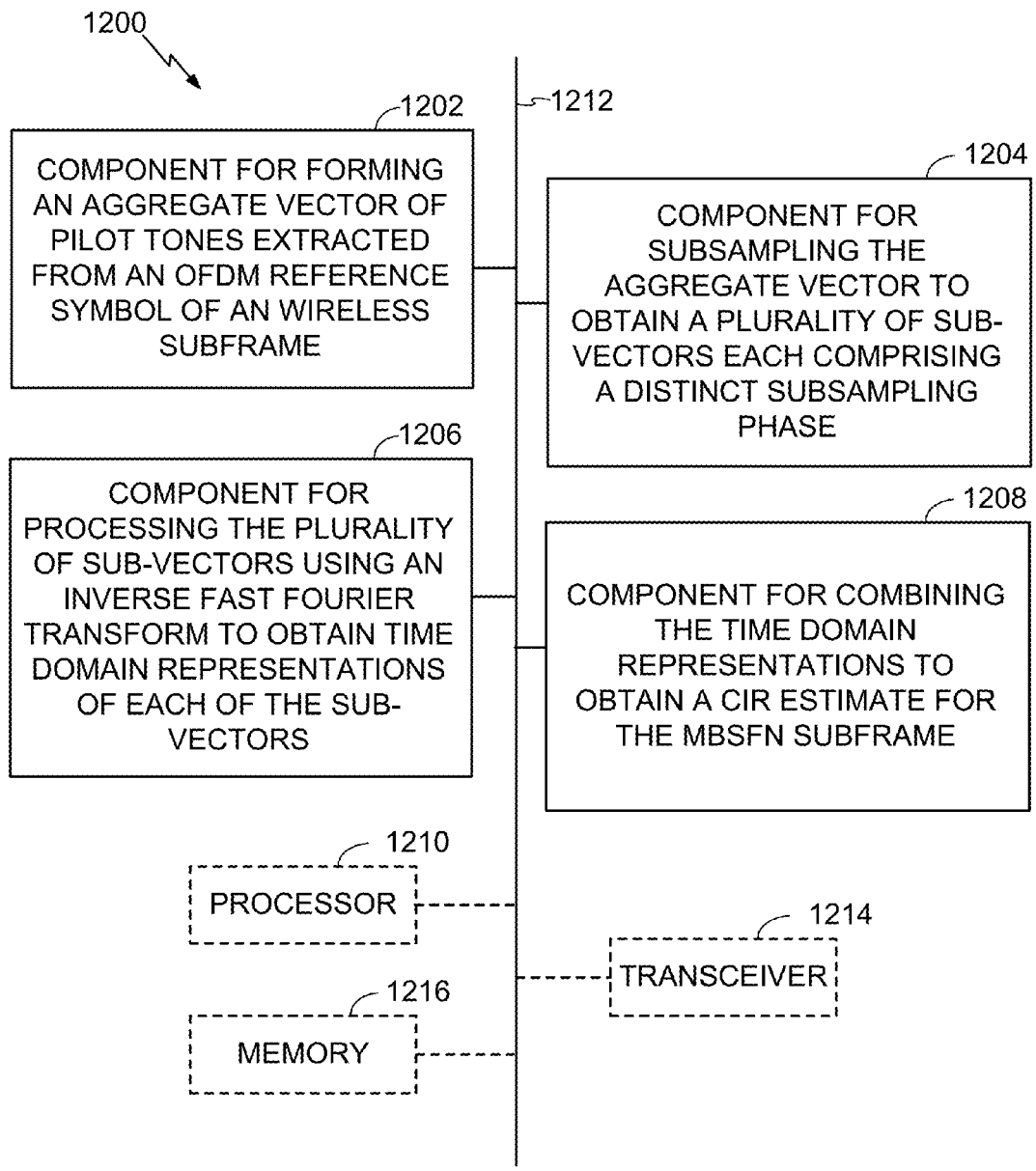
FIG. 12 is a block diagram illustrating an embodiment of an apparatus for estimating a CIR for an MBSFN channel, in accordance with the methodologies of FIGS. 8-11.

With reference to FIG. 12, there is provided an exemplary apparatus 1200 that may be configured as a mobile entity or UE in a wireless network, or as a processor or similar device for use within the ME or UE, for estimating a channel impulse response for a multimedia broadcast multicast services single frequency network transmission. The apparatus 1200 may include functional blocks that can represent functions implemented by a processor, software, or combination thereof (e.g., firmware).

In one embodiment, the apparatus 1200 may include an electrical component or module 1202 for forming an aggregate vector of pilot tones extracted from an OFDM reference symbol of an wireless subframe. For example, the electrical component 1202 may include at least one control processor coupled to a transceiver or the like and to a memory with instructions for receiving the wireless subframe, recognizing the pilot tones in the subframe and extracting the pilot tones according to an ordered arrangement representing a vector in the memory. The apparatus 1200 may include an electrical component 1204 for subsampling the aggregate vector to obtain a plurality of sub-vectors each comprising a distinct subsampling phase. For example, the electrical component 1204 may include at least one control processor coupled to a memory holding instructions for extracting sub-vectors from the stored vector of pilot tones, using a sampling algorithm, for input to an IFFT process. The apparatus 1200 may include an electrical component 1206 for processing the plurality of sub-vectors using an inverse fast Fourier transform to obtain time domain representations of each of the sub-vectors. For example, the electrical component 1206 may include at least one control processor coupled to a memory holding instructions for applying an IFFT process to each of the sub-vectors to obtain separate time domain representations, which the processor may store temporarily in the memory for further processing. The apparatus 1200 may include an electrical component 1208 for combining the time domain representations to obtain a CIR estimate for the wireless subframe. For example, the electrical component 1208 may include at least one control processor coupled to a memory holding instructions for combining the stored time domain representations resulting from the IFFT processing of sub-vectors to obtain the CIR estimate, using any of the detailed algorithms presented herein. The processor may subsequently use the CIR estimate for operational aspects of the mobile entity in any suitable manner. The apparatus 1200 may include similar electrical components for performing any or all of the additional operations 900, 1000 or 1100 described in connection with FIGS. 9-11, which for illustrative simplicity are not shown in FIG. 12.

In related aspects, the apparatus 1200 may optionally include a processor component 1210 having at least one processor, in the case of the apparatus 1200 configured as a mobile entity. The processor 1210, in such case, may be in operative communication with the components 1202-1208 or similar components via a bus 1212 or similar communication coupling. The processor 1210 may effect initiation and scheduling of the processes or functions performed by electrical components 1202-1208. The processor 1210 may encompass the components 1202-1208, in whole or in part. In the alternative, the processor 1210 may be separate from the components 1202-1208, which may include one or more separate processors.

In further related aspects, the apparatus 1200 may include a radio transceiver component 1214. A stand alone receiver and/or stand alone transmitter may be used in lieu of or in conjunction with the transceiver 1214. In the alternative, or in addition, the apparatus 1200 may include multiple transceivers or transmitter/receiver pairs, which may be used to transmit and receive on different carriers. The apparatus 1200 may optionally include a component for storing information, such as, for example, a memory device/component 1216. The computer readable medium or the memory component 1216 may be operatively coupled to the other components of the apparatus 1200 via the bus 1212 or the like. The memory component 1216 may be adapted to store computer readable instructions and data for performing the activity of the components 1202-1208, and subcomponents thereof, or the processor 1210, or the additional aspects 900, 1000 or 1100, or the methods disclosed herein. The memory component 1216 may retain instructions for executing functions associated with the components 1202-1208. While shown as being external to the memory 1216, it is to be understood that the components 1202-1208 can exist within the memory 1216.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transient tangible medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for estimating a channel impulse response (CIR) for a wireless transmission, using a receiver, the method comprising:
    forming an aggregate vector of pilot tones extracted from an Orthogonal Frequency Division Multiplex (OFDM) reference symbol of an wireless transmission subframe;
    subsampling the aggregate vector to obtain a plurality of sub-vectors each comprising a distinct subsampling phase;
    processing the plurality of sub-vectors using an inverse fast Fourier transform to obtain time domain representations of each of the sub-vectors; and
    combining the time domain representations to obtain a CIR estimate for the wireless subframe.

2. The method of claim 1, wherein subsampling the aggregate vector is performed to obtain the each of the sub-vectors having an identical number of elements.

3. The method of claim 1, wherein subsampling the aggregate vector comprises, for each of a number 'p' of subsampling phases from 0 to p−1, selecting every '$p^{th}$' pilot tone from the aggregate vector to obtain respective p sub-vectors containing distinct subsets of the pilot tones.

4. The method of claim 3, further comprising selecting a value of 'p' to obtain the CIR having a more compact representation.

5. The method of claim 4, wherein a value of three is selected for 'p'.

6. The method of claim 1, wherein subsampling the aggregate vector comprises, for each of three subsampling phases from 0 to 2, selecting every third pilot tone from the aggregate vector to obtain three respective sub-vectors containing distinct subsets of the pilot tones.

7. The method of claim 1, wherein combining the time domain representations further comprises extending and destaggering the time domain representations to obtain the CIR estimate.

8. The method of claim 1, wherein forming the aggregate vector comprises using only pilot tones extracted from a single OFDM reference symbol to form the aggregate vector.

9. The method of claim 1, wherein combining the time domain representations further comprises extending and destaggering the time domain representations to obtain the CIR estimate, and forming the aggregate vector comprises using only pilot tones extracted from a single OFDM reference symbol to form the aggregate vector.

10. The method of claim 1, wherein forming the aggregate vector comprises combining pilot tones extracted from adjacent OFDM reference symbols to form the aggregate vector, to increase a resolvable delay spread of the CIR estimate.

11. The method of claim 10, wherein combining the time domain representations further comprises extending and destaggering the time domain representations to form a first time domain representation.

12. The method of claim 11, further comprising destaggering the first time domain representation across OFDM reference symbol pairs to provide the CIR estimate.

13. The method of claim 1, wherein forming the aggregate vector comprises combining pilot tones extracted from adjacent OFDM reference symbols to form the aggregate vector, to increase a resolvable delay spread of the CIR estimate, combining the time domain representations further comprises extending and destaggering the time domain representations to form a first time domain representation, and further comprising destaggering the first time domain representation across OFDM reference symbol pairs to provide the CIR estimate.

14. The method of claim 1, further comprising receiving the wireless transmission comprising a multimedia broadcast multicast services single frequency network (MBSFN) transmission, wherein the wireless subframe comprises an MBSFN subframe.

15. An apparatus for estimating a channel impulse response (CIR) for a wireless transmission, the apparatus comprising:
    means for forming an aggregate vector of pilot tones extracted from an Orthogonal Frequency Division Multiplex (OFDM) reference symbol of an wireless subframe;
    means for subsampling the aggregate vector to obtain a plurality of sub-vectors each comprising a distinct subsampling phase;
    means for processing the plurality of sub-vectors using an inverse fast Fourier transform to obtain time domain representations of each of the sub-vectors; and
    means for combining the time domain representations to obtain a CIR estimate for the wireless subframe.

16. An apparatus for estimating a channel impulse response (CIR) for a wireless transmission, comprising:
    at least one processor configured for forming an aggregate vector of pilot tones extracted from an Orthogonal Frequency Division Multiplex (OFDM) reference symbol of an wireless subframe, subsampling the aggregate vector to obtain a plurality of sub-vectors each comprising a distinct subsampling phase, processing the plurality of sub-vectors using an inverse fast Fourier transform to obtain time domain representations of each of the sub-vectors, and combining the time domain representations to obtain a CIR estimate for the wireless subframe; and
    a memory coupled to the at least one processor for storing data.

17. The apparatus of claim 16, wherein the processor is further configured for subsampling the aggregate vector to obtain the each of the sub-vectors having an identical number of elements.

18. The apparatus of claim 16, wherein the processor is further configured for subsampling the aggregate vector by, for each of a number 'p' of subsampling phases from 0 to p−1, selecting every 'pth' pilot tone from the aggregate vector to obtain respective p sub-vectors containing distinct subsets of the pilot tones.

19. The apparatus of claim 18, wherein the processor is further configured for selecting a value of 'p' to obtain the CIR having a more compact representation.

20. The apparatus of claim 19, wherein the processor is further configured for selecting p equal to three.

21. The apparatus of claim 16, wherein the processor is further configured for combining the time domain representations by extending and destaggering the time domain representations to obtain the CIR estimate.

22. The apparatus of claim 16, wherein the processor is further configured for forming the aggregate vector comprises using only pilot tones extracted from a single OFDM reference symbol to form the aggregate vector.

23. The apparatus of claim 16, wherein the processor is further configured for forming the aggregate vector by combining pilot tones extracted from adjacent OFDM reference symbols to form the aggregate vector, to increase a resolvable delay spread of the CIR estimate.

24. The apparatus of claim 23, wherein the processor is further configured for combining the time domain representations by extending and destaggering the time domain representations to form a first time domain representation.

25. The apparatus of claim 24, wherein the processor is further configured for destaggering the first time domain representation across OFDM reference symbol pairs to provide the CIR estimate.

26. The apparatus of claim 16, wherein the processor is further configured for receiving the wireless transmission comprising a multimedia broadcast multicast services single frequency network (MBSFN) transmission, wherein the wireless subframe comprises an MBSFN subframe.

27. A computer program product for estimating a channel impulse response (CIR) for a wireless transmission, comprising:
    a non-transitory computer-readable medium comprising code for forming an aggregate vector of pilot tones extracted from an Orthogonal Frequency Division Multiplex (OFDM) reference symbol of an wireless subframe, subsampling the aggregate vector to obtain a plurality of sub-vectors each comprising a distinct subsampling phase, processing the plurality of sub-vectors using an inverse fast Fourier transform to obtain time domain representations of each of the sub-vectors, and combining the time domain representations to obtain a CIR estimate for the wireless subframe.

28. The computer program product according to claim 27, further comprising code for subsampling the aggregate vector to obtain the each of the sub-vectors having an identical number of elements.

29. The computer program product according to claim 27, further comprising code for subsampling the aggregate vector by, for each of a number 'p' of subsampling phases from 0 to p−1, selecting every 'pth' pilot tone from the aggregate vector to obtain respective ones of p sub-vectors containing distinct subsets of the pilot tones.

30. The computer program product according to claim 29, further comprising code for selecting a value of 'p' to obtain the CIR having a more compact representation.

31. The computer program product according to claim 27, further comprising code for combining the time domain representations by extending and destaggering the time domain representations to obtain the CIR estimate.

32. The computer program product according to claim 27, further comprising code for forming the aggregate vector comprises using only pilot tones extracted from a single OFDM reference symbol to form the aggregate vector.

33. The computer program product according to claim 27, further comprising code for forming the aggregate vector by combining pilot tones extracted from adjacent OFDM reference symbols to form the aggregate vector, to increase a resolvable delay spread of the CIR estimate.

34. The computer program product according to claim 27, further comprising code for receiving the wireless transmission comprising a multimedia broadcast multicast services single frequency network (MBSFN) transmission, wherein the wireless subframe comprises an MBSFN subframe.

* * * * *